(12) United States Patent
Kramer, Jr. et al.

(10) Patent No.: US 9,180,637 B2
(45) Date of Patent: Nov. 10, 2015

(54) REINFORCED FLEXIBLE TUBING AND METHOD OF MAKING SAME

(75) Inventors: Vance M. Kramer, Jr., Perrysburg, OH (US); Jonathan O. Rodebaugh, Perrysburg, OH (US)

(73) Assignee: CRUSHPROOF TUBING COMPANY, McComb, OH (US)

( * ) Notice: Subject to any disclaimer, the term of this patent is extended or adjusted under 35 U.S.C. 154(b) by 881 days.

(21) Appl. No.: 13/208,936

(22) Filed: Aug. 12, 2011

(65) Prior Publication Data
US 2013/0037159 A1 Feb. 14, 2013

(51) Int. Cl.
*B29D 23/18* (2006.01)
*F16L 11/115* (2006.01)

(52) U.S. Cl.
CPC ............... *B29D 23/18* (2013.01); *F16L 11/115* (2013.01)

(58) Field of Classification Search
CPC ....... F16L 11/115; B29C 23/18; B29C 63/42; B29C 63/18; B29C 53/36; B29C 53/58; B29C 65/02; B29C 66/7375; B29D 23/18; B32B 5/26; B32B 2307/736; B32B 5/06; B32B 2255/02; B32B 2260/021; B32B 2262/106; B32B 2270/00; B32B 25/10; B32B 3/28
USPC ......... 156/144, 143, 169, 173, 172, 184, 185, 156/187, 188, 196, 429, 430, 446, 156, 156/73.4, 84, 86, 85, 180, 195; 138/122, 138/129, 173, 121
See application file for complete search history.

(56) References Cited

U.S. PATENT DOCUMENTS

| | | | |
|---|---|---|---|
| 2,713,885 A * | 7/1955 | McKinley | 156/143 |
| 2,832,096 A | 4/1958 | Kramer et al. | |
| 2,879,953 A | 3/1959 | Kramer et al. | |
| 2,888,719 A | 6/1959 | Brengman | |
| 2,909,198 A | 10/1959 | Kramer et al. | |
| 3,028,289 A * | 4/1962 | Roberts et al. | 156/143 |
| 3,155,757 A | 11/1964 | Kramer et al. | |
| 3,168,604 A | 2/1965 | Kramer et al. | |
| 3,294,607 A * | 12/1966 | Rothermel et al. | 156/144 |
| 3,296,047 A * | 1/1967 | Parr | 156/86 |
| 3,304,581 A | 2/1967 | Kramer et al. | |
| 3,635,255 A | 1/1972 | Kramer | |
| 3,669,586 A | 6/1972 | Kramer | |
| 3,705,780 A | 12/1972 | Kramer et al. | |
| 3,809,522 A | 5/1974 | Kramer | |
| 3,975,129 A | 8/1976 | Kramer, Sr. | |
| 4,053,275 A | 10/1977 | Kramer, Sr. et al. | |
| 4,065,339 A | 12/1977 | Lippert et al. | |
| 4,205,034 A | 5/1980 | Newberry | |
| 4,360,493 A * | 11/1982 | Kramer et al. | 264/506 |
| 5,600,752 A | 2/1997 | Lopatinsky | |
| 5,608,963 A | 3/1997 | Lefere | |
| 5,829,483 A | 11/1998 | Tukahara et al. | |
| 6,286,555 B1 | 9/2001 | Pauker et al. | |
| 6,852,036 B2 | 2/2005 | Cermak et al. | |
| 7,354,349 B2 | 4/2008 | Wette | |
| 2005/0029000 A1* | 2/2005 | Aisenbrey | 174/35 MS |

* cited by examiner

*Primary Examiner* — Jacob T Minskey
*Assistant Examiner* — Vishal I Patel
(74) *Attorney, Agent, or Firm* — Rankin, Hill & Clark LLP

(57) ABSTRACT

A method for making helically corrugated rubber tubing with a helical reinforcing element embedded therein and with a relatively smooth interior surface. The tubing is formed with separate inner and outer tubular wall portions with fabric material in between. The inner and outer wall portions may be formed of different elastomeric compositions. Also the method provides for annular cuffs at the opposite ends of the tubing.

14 Claims, 3 Drawing Sheets

REINFORCED FLEXIBLE TUBING AND METHOD OF MAKING SAME

BACKGROUND OF INVENTION

1. Field of Invention

This invention relates to crush resistant flexible tubing for conveying liquids and gases. The tubing is formed primarily of uncured elastomeric material that, when cured, provides a strong but flexible length of tubing. More particularly, the invention relates to tubing that has external helical corrugations formed along its axial length as well as supplemental reinforcement embedded therein. The invention especially concerns a unique method for making the reinforced tubing.

2. Description of Related Art

Flexible tubing with helical corrugations to provide crush resistance is typically made using either the "cording" method disclosed in U.S. Pat. Nos. 2,832,096; 2,879,953; 2,888,719; 2,909,198; 3,155,757 and 3,635,255 or the "axially extensible form" method disclosed in U.S. Pat. Nos. 3,168,604; 3,304,581; 3,669,586; 3,705,780; 3,809,522; 3,975,129; 4,053,275. These patents are further referred to below and incorporated by reference herein.

The present invention concerns a novel variation of the type of corrugated tubing that may be made using either the "cording" method or the "axially extensible form" method, the tubing of the invention not only having helical corrugations but also having a correspondingly shaped helical reinforcing element embedded therein along its length.

Helically corrugated tubing resulting from the "cording" method is made by first sliding an extruded sleeve of uncured rubber axially over a rotatable mandrel with a continuous thread formed on its outer surface. When in place on the mandrel, the sleeve is forced into the helical groove or root of the thread by wrapping a length of cord around the sleeve as the sleeve rotates with the mandrel. This serves to impart a desired corrugated shape to the uncured rubber sleeve.

The resulting assembly is then removed from its rotary support and placed in an oven or autoclave to cure the rubber sleeve and set the helical corrugations. The cord is removed from the corrugated tubing by placing the assembly back on a rotary support and rotating the mandrel in the reverse direction while unwinding the cord from the cured tube. After the removal of the cord, the corrugated tube length may be removed from the mandrel by introducing air under pressure between the outer surface of the mandrel and the inner surface of the corrugated tube.

Helically corrugated tubing resulting from the "axially extensible form" method is made using an external forming device having axially spaced helical convolutions. These devices are employed with a forming mandrel to produce embryonic corrugations in an uncured rubber sleeve. The external forming member is placed over the forming mandrel on which the uncured rubber sleeve has been positioned and the sleeve is radially expanded with air pressure from within so that the sleeve bulges into the spaces between the helical convolutions. The external forming member and sleeve are then collapsed axially so that the sleeve is axially compressed concertina fashion to produce embryonic helical corrugations in the sleeve. After this, the forming member is axially extended together with the sleeve and the sleeve is removed from the forming mandrel. Then the sleeve is placed on a curing mandrel where it is axially foreshortened into corrugated form with the desired spacing between adjacent helical convolutions.

The tubular product resulting from either of these methods is both flexible and resilient, but also has sufficient crush resistance to satisfy most application. Also, the tube has a wall that defines continuous internal and external threads with alternating crests and roots along the tube length. In other words, the wall portion that defines a crest portion of the external thread also defines, on its opposite side, the root portion of the internal thread. Thus the tube has an interior surface that is corrugated or ribbed as opposed to being relatively smooth.

While an interior surface that is "ribbed" is suitable for many applications, there are some circumstances where a smooth interior surface would be much preferred if not in fact essential.

For example, in the case of scuba gear, a breathing tube with a smooth interior surface would provide a better flow rate and be easier to clean.

Likewise in aerospace applications a breathing tube with a smooth interior surface would be much preferred for the same reasons.

Another example is tubing for use in land re-breathing devices to filter and purify ambient air in a hazardous gas environment.

A particular limitation as to corrugated rubber tubing made in accordance with either the "cording" method or the "axially extensible form" method is the degree of crush resistance that can be obtained. While the tubing has sufficient resilience to return to its normal condition when crushed (e.g. when stepped on) there are some applications where greater resistance to crushing or kinking is necessary. One such application is wiring protection hose.

Another limitation as to the type of corrugated rubber referred to above is that in some applications a combination of requirements cannot be satisfied by any single elastomeric composition. For example in the oil industry, tubing for conveying oil or gasoline must have an inner surface that resists deterioration due to the corrosive effect of various chemicals. In addition the external surface of the tubing must resist breakdown due to ultra-violet radiation and corrosion due to salt water. No single compound is available economically that meets both of these requirements.

The method of the present invention, however, provides a novel type of helically corrugated rubber tubing that meets the requirements described above and affords other features and advantages heretofore not obtainable.

BRIEF SUMMARY OF THE INVENTION

The unique flexible tubing resulting from the practice of the invention is not only provided with external helical corrugations but also with a helical reinforcing element embedded therein. This is accomplished using certain novel variations of the "cording" method and the "axially extensible form" method described above, these variations being combined in a single process. The process provides corrugated tubing having a relatively smooth interior wall surface and that may have interior and exterior wall portions formed of different elastomeric compositions to provide a combination of desired characteristics.

In accordance with the invention, helically corrugated tubing with a helical reinforcing element embedded therein is made by first sliding an extruded inner sleeve of uncured rubber axially over an assembly mandrel, after which a helical spring-like reinforcing element, preferably formed of stiff hard metal such as stainless steel, is slid axially over the inner sleeve. The reinforcing element is formed to provide appropriate spacing between its helical convolutions. The spacing should be sufficient to accommodate the cord used in the novel variation of the "cording" method to follow later in the process.

Then air pressure is applied between the mandrel and the inner sleeve to radially expand the sleeve into engagement with the surrounding reinforcing element (i.e. in a manner similar to that used in the "axially extensible form" method).

At this point, a heat shrinkable fabric is placed around the helical reinforcing element and heat is applied sufficiently to cause the fabric to shrink around and tightly engage the reinforcing element and the exposed portions of the inner sleeve that are located in the spaces between the convolutions of the reinforcing element. Then an extruded outer sleeve of uncured rubber is slid into position around the shrunken fabric and the reinforcing element. This completes the initial assembly of the tubing.

The resulting preliminary assembly may then be removed from the assembly mandrel and placed on a rotatatable cording mandrel. Then the cording mandrel is rotated as a length of cord is fed to and wrapped around the outer sleeve to press portions of the sleeve into the spaces between the adjacent convolutions of the helical reinforcing element. This procedure is generally in accordance with the corresponding step of the "cording" method referred to above.

The cording mandrel with the "corded" tubular assembly thereon is placed in an oven and heated to cure the inner and outer sleeves with the helical reinforcing element embedded between them. After curing, the cording mandrel and the resulting corrugated tube length are removed from the oven and the mandrel is rotated in the reverse direction while the cord is unwrapped from the tube length. When this is done the completed corrugated tube length is removed from the cording mandrel.

The resulting tubular product is characterized by a helical reinforcing element embedded therein, by puncture resistant fabric embedded therein, by a relatively smooth interior wall surface and, in some circumstances, by having inner and outer wall portions formed of different elastomeric compositions to satisfy complex requirements.

As another aspect of the invention, the reinforced corrugated tubing may have a relatively stiff rubber cuff or fitting formed at one or both ends. The cuff has a smooth exterior surface and has a tubular wall substantially thicker than the wall of the corrugated portion of the tube length. The cuffs are provided to facilitate connection of the tubing to associated equipment.

The cuffs are formed by providing end portions of the inner sleeve that extend axially beyond the ends of the reinforcing element. After the inner sleeve is radially expanded, its axially extending end portions are preferably coated with a self vulcanizing cement and then wrapped with several layers of uncured rubber sheet material to form annular bands. One surface of the sheet material is preferably coated with a suitable adhesive to adhere the adjacent layers of sheet material to one another. The resulting thickness of the tubular wall of the bands is dictated by the size of the end fitting needed and the outer diameter of the bands is approximately the same as the inner diameter of the outer sleeve.

When the uncured rubber outer sleeve is placed over the shrunken fabric and the helical reinforcing element, the outer end portions of the outer sleeve surround and engage the outer surfaces of the annular bands. When the tubular assembly is heated and cured, the resulting end assemblies become stiff integral cuffs suitable for use as fittings to connect the corrugated tubing to associated equipment.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF THE INVENTION

FIGS. 1 through 7 of the drawings illustrate sequentially the steps used in practicing the method of the invention. The apparatus used in the process includes a tubular assembly mandrel 10 having a number of small holes 11 extending through its tubular wall. The inner end of the assembly mandrel 10 is connected to an air pressure source 12 for supplying air under pressure to the inside of the mandrel and then outward through the holes 11.

Figure 1:
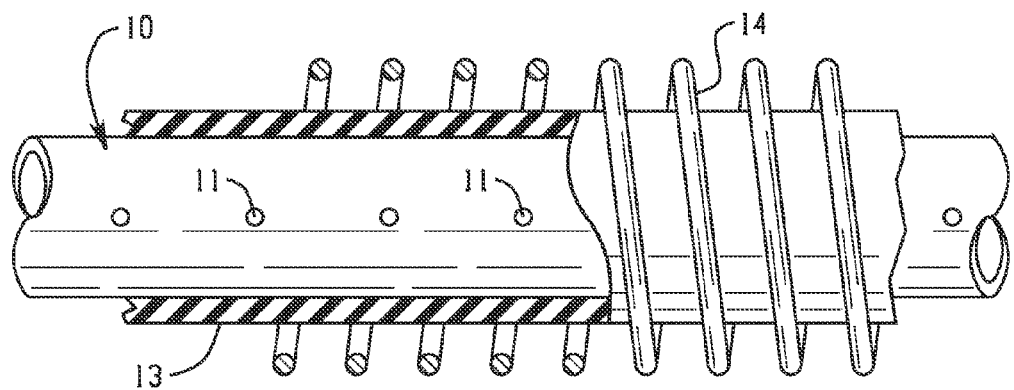
FIGS. 1 through 7 are fragmentary elevations illustrating sequentially, the method for making reinforced corrugated rubber tubing in accordance with the invention, with parts broken away and shown in section.

As illustrated in FIG. 1, the process is begun by sliding an extruded inner sleeve 13 of uncured rubber over the mandrel 10. Air pressure may be used to facilitate the positioning of the sleeve. The sleeve may be formed for example of EDPM rubber or nitrile rubber depending on the particular application. When EDPM rubber is used it preferably has a durometer hardness of between 50 and 60.

When the inner sleeve 13 has been positioned, a helical, spring-like reinforcing element 14, preferably formed of stiff metal, is slid over the inner sleeve and located so that the end portions 15 and 16 of the inner sleeve extend axially several inches beyond the ends of the reinforcing element 14. The convolutions of the helical reinforcing element are axially spaced sufficiently to permit helical corrugations of the desired size and shape to be formed in the tubing. The helical reinforcing element 14 is preferably formed of stainless steel such as 302 Stainless Steel with a thickness of 0.05 inches. The inner diameter of the reinforcing element 14 is slightly larger than the outer diameter of the inner sleeve 13.

Figure 2:
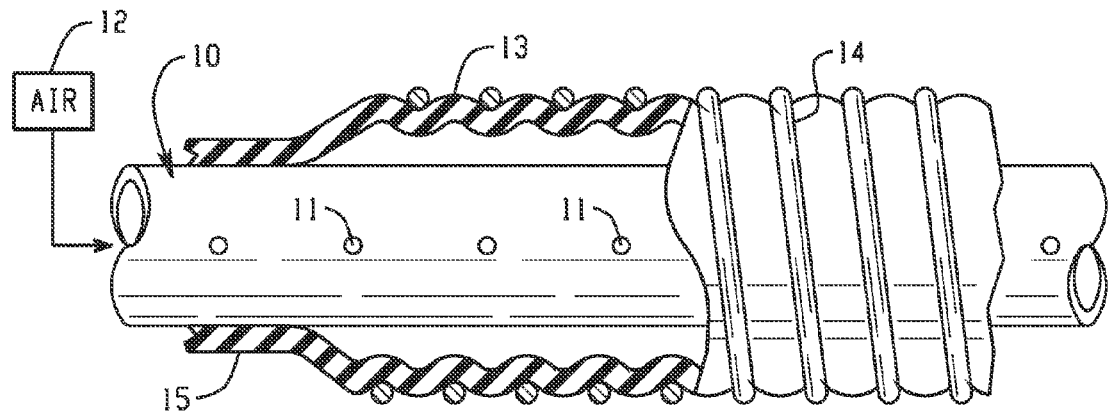

Then the pressure source 12 is activated to introduce air under pressure to the space between the outer surface of the mandrel 10 and the inner surface of the inner sleeve 13, to radially expand the sleeve into engagement with the helical reinforcing element 14 as shown in FIG. 2.

Figure 3:
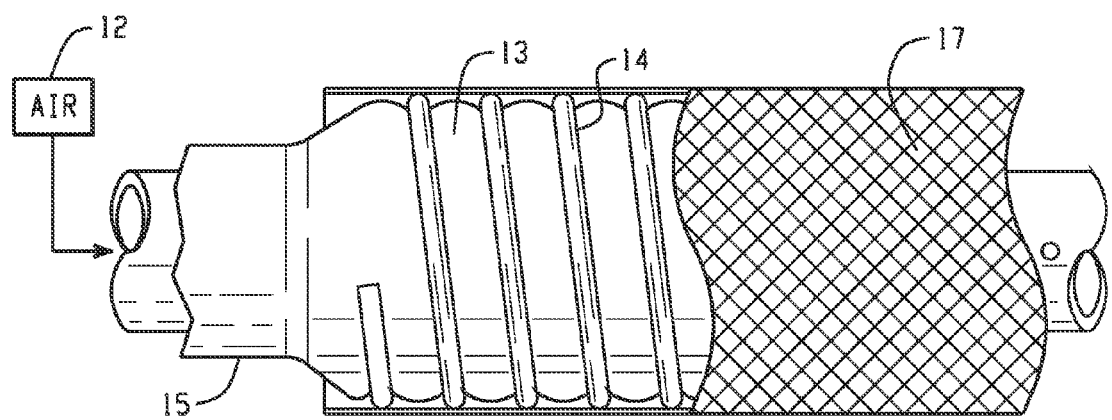

As illustrated in FIG. 3, after the inner sleeve 13 is radially expanded, a heat shrinkable fabric in the form of a sleeve 17 is placed around the helical reinforcing element 14 and the underlying portions of the inner sleeve 13. Here again, air pressure may be used to facilitate the positioning of the fabric sleeve. A suitable heat shrinkable fabric in tubular form and made of polyolefin weft and polyester warp yarns is available in a variety of sizes from a supplier doing business under the trade name "BuyHeatShrink.com" and whose address is PO Box 82, Essex Falls, N.J. The fabric sleeve 17 has an axial length about the same as that of the helical reinforcing element 14 so that it does not cover the end portions 15 and 16 of the inner sleeve 13.

Figure 4:
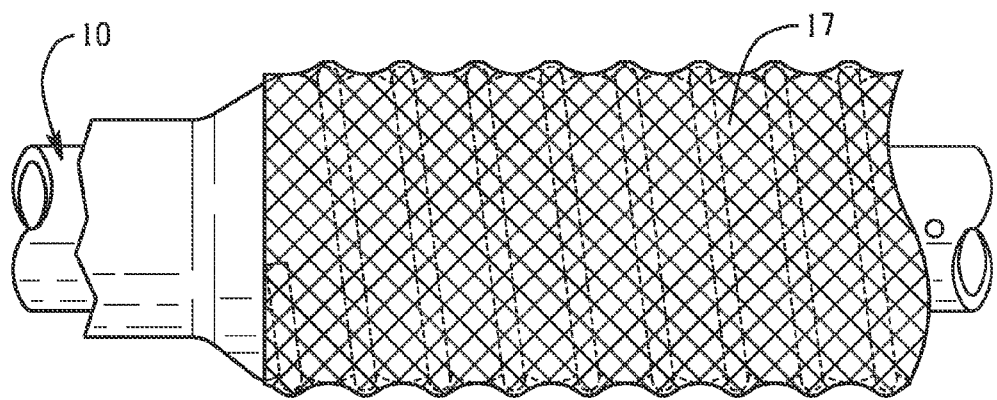

The fabric sleeve 17 is then heated, using a heat gun or other heating device, to cause the fabric to shrink around and tightly engage the reinforcing element 14 and the exposed portions of the inner sleeve 13 that are positioned in the spaces between the convolutions of the reinforcing element. This step is illustrated in FIG. 4. In addition to other advantages, the fabric provides improved resistance to puncture.

Figure 5:
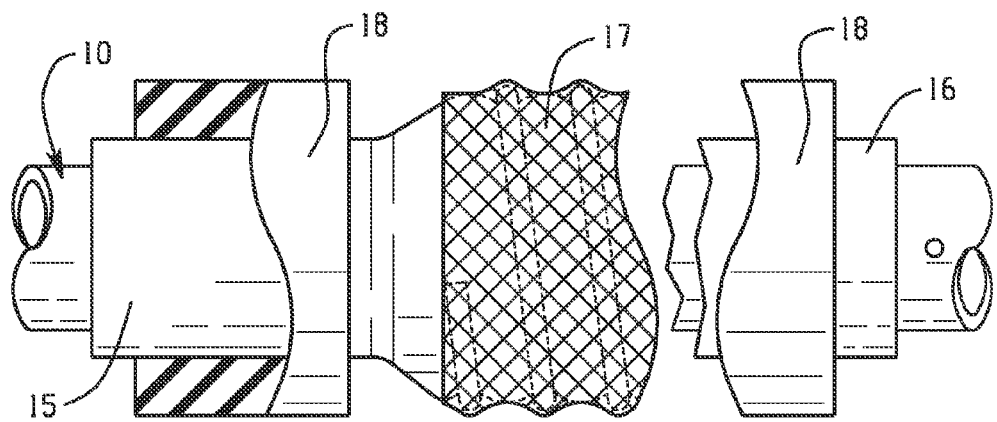

The next steps are addressed to the end portions 15 and 16 of the inner sleeve 14 as illustrated in FIG. 5. While FIG. 5 illustrates the process for only one end of the assembly, the procedure is the same for both ends. First, the end portions 15 and 16 are coated with a self-vulcanizing rubber cement. Suitable self-vulcanizing cements for this purpose are readily available from a variety of sources. Then the end portions 15 and 16 are wrapped with several layers of uncured rubber sheet material to form annular bands 18. A suitable rubber sheet material for this purpose is available under the name "CHEM GUM" from Patch Rubber Company located at 100 Patch Rubber Rd., Weldon, N.C. One surface of the sheet material is preferably coated with a suitable adhesive to adhere the adjacent layers of sheet material to one another. The thickness of the tubular walls of the bands is determined by the size of the end fittings needed for the associated equipment.

Figure 6:
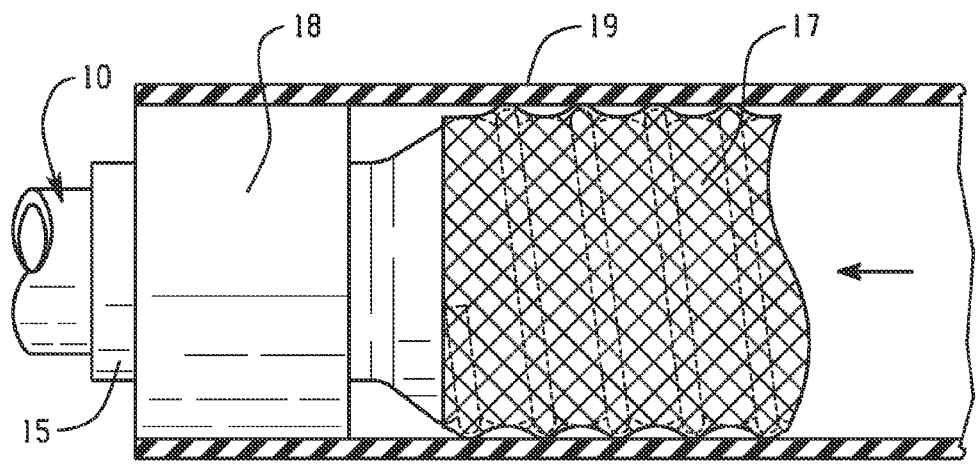

With the inner sleeve 13, reinforcing element 14, fabric sleeve 17 and bands 18 thus assembled, an extruded outer sleeve 19 of uncured rubber is slid into position over the assembly, including the tubular bands 18 at each end as illustrated in FIG. 6. The outer sleeve 19 may be formed of a different elastomeric composition than the inner sleeve 13 if preferred. This may be useful where certain characteristics (such as resistance to chemical corrosion) are required for the interior wall portion of the tubing and certain other characteristics (such as resistance to ultra violet radiation) are required for the exterior wall portion of the tubing. This completes the assembly of the various components.

Figure 7:
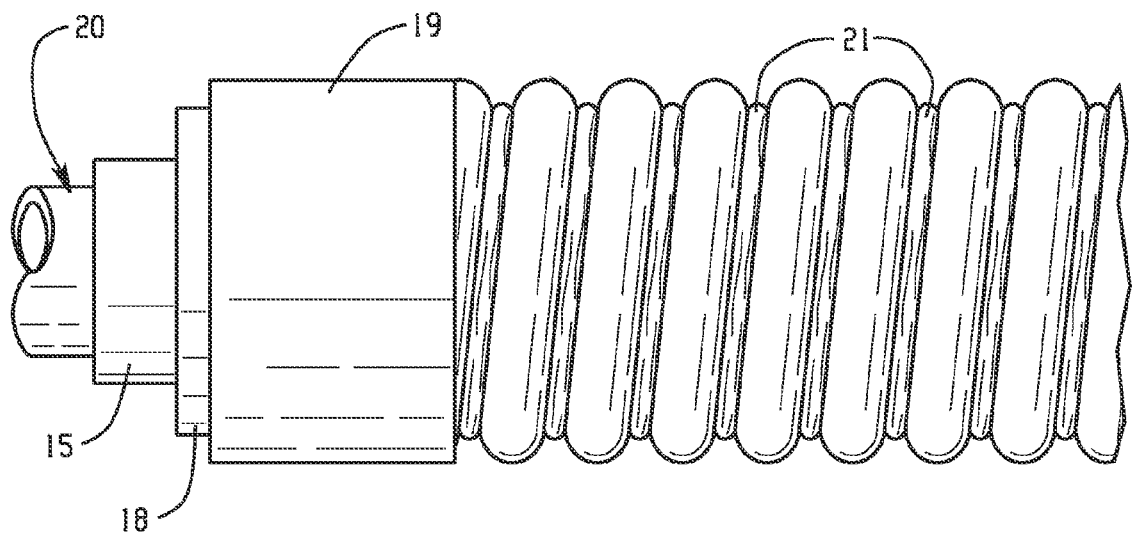

The resulting assembly is then removed from the assembly mandrel 10 using air pressure in much the same way as air pressure was used in the steps illustrated in FIG. 2. Then the assembly is slid onto a rotatable cording mandrel 20 as illustrated in FIG. 7. The cording process referred to above is then used to form helical corrugations. This is accomplished by rotating the mandrel 20 as a length of cord 21 is fed to and wrapped progressively around the outer sleeve 19 to press portions of the sleeve into the spaces between adjacent convolutions of the helical reinforcing element 14. Nylon cord is particularly suitable for this purpose.

Figure 8:
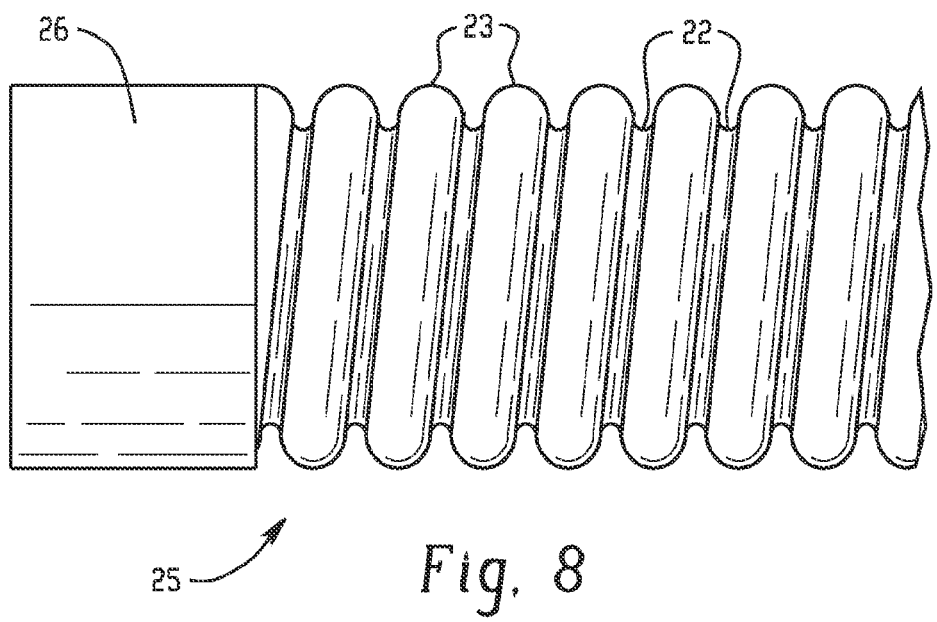
FIG. 8 is a fragmentary elevation illustrating a length of reinforced corrugated rubber tubing made in accordance with the method of the invention.

Then the cording mandrel 20 with the "corded" tubular assembly thereon is placed in a curing oven and heated to cure the inner and outer sleeves 13 and 19, as well as the bands 18. After curing, the cording mandrel 20 and the resulting reinforced corrugated tube length 25 are removed from the oven and the cording mandrel is rotated in the reverse direction as the cord is unwrapped. Finally, the outer ends of the cuffs 26 are trimmed to remove excess material. The resulting tubular product 25 is illustrated (in part) in FIG. 8. The product has a helical reinforcing element embedded therein to provide improved resistance to crushing and also has fabric embedded therein to resist puncture. Another important feature is that the interior wall surface of the tubing is relatively smooth and thus affords lower resistance to the flow of liquids and gases. Accordingly, the invention provides significantly improved helically corrugated rubber tubing, particularly, as compared with tubing made using (separately) either the "cording" method or the "axially extensible form" method referred to above.

While the invention has been shown and described with respect to specific embodiments thereof, this is intended for the purpose of illustration rather than limitation and other variations and modifications of the specific embodiments herein shown and described will be apparent to those skilled in the art, all within the spirit and scope of the invention. Accordingly, the patent is not to be limited in scope and effect to the specific embodiments herein shown and described, or in any other way that is inconsistent with the extent to which the progress in the art has been advanced by the invention.

What is claimed is:

1. A method for making a length of flexible, helically corrugated rubber tubing with a helical spring-like reinforcing element embedded therein comprising the steps of:
    sliding an uncured rubber inner sleeve over an assembly mandrel;
    sliding a helical, spring-like reinforcing element over the inner sleeve, wherein the inner sleeve has end portions that extend axially beyond respective ends of the helical reinforcing element;
    applying air pressure between the assembly mandrel and the inner sleeve to radially expand the inner sleeve into engagement with the surrounding reinforcing element;
    placing a heat shrinkable fabric around the helical reinforcing element such that the fabric covers the helical reinforcing element but does not cover the end portions of the inner sleeve that extend axially beyond the respective ends of the helical reinforcing element;
    applying sufficient heat to the fabric to shrink the fabric around and into tight engagement with the reinforcing element and the inner sleeve;
    sliding an uncured rubber outer sleeve over the shrunken fabric, the helical reinforcing element and the uncured rubber inner sleeve to form a tubular assembly, wherein the outer sleeve includes end portions that extend axially beyond the respective ends of the helical reinforcing element;
    rotating the tubular assembly about its axis while wrapping a cord about the outer sleeve to press portions of the outer sleeve into the spaces between adjacent convolutions of the reinforcing element;
    heating the tubular assembly with the cord wrapped thereon to cure the inner and outer sleeves with the helical reinforcing element and fabric embedded therein to provide a cured length of rubber tubing; and
    rotating the cured length of tubing about its axis in the reverse direction while unwrapping and removing the cord.

2. A method as defined in claim 1 wherein the helical, spring-like reinforcing element is formed of metal.

3. A method as defined in claim 2 wherein the helical, spring-like reinforcing element is formed of stainless steel.

4. A method as defined in claim 1 wherein the heat shrinkable fabric comprises polyolefin weft yarns.

5. A method as defined in claim 4 wherein the heat shrinkable fabric further comprises polyester warp yarns.

6. A method as defined in claim 1 including, before the step of sliding the uncured rubber outer sleeve over the helical reinforcing element, the additional steps of:
    wrapping uncured rubber sheet material around at least one of the end portions of the inner sleeve in a plurality of layers to form a band; and
    when the uncured rubber outer sleeve is slid over the helical reinforcing element, placing one of the respective axially extending end portions of the uncured rubber outer sleeve over the band.

7. A method as defined in claim 1 wherein the uncured rubber inner sleeve and the uncured rubber outer sleeve are formed of different elastomeric compositions.

8. A length of reinforced helically corrugated rubber tubing made in accordance with the method of claim 1.

9. A method for making a length of flexible, helically corrugated rubber tubing with a helical spring-like metal reinforcing element embedded therein, comprising the steps of:
- sliding an uncured rubber inner sleeve over an assembly mandrel with a cylindrical outer surface;
- sliding a helical, spring-like metal reinforcing element over the inner sleeve, wherein the inner sleeve has end portions that extend axially beyond respective ends of the helical reinforcing element;
- applying air pressure between the assembly mandrel and the inner sleeve to radially expand the inner sleeve into engagement with the surrounding reinforcing element;
- placing a heat shrinkable fabric around the helical reinforcing element such that the fabric covers the helical reinforcing element but does not cover the end portions of the inner sleeve that extend axially beyond the respective ends of the helical reinforcing element;
- applying sufficient heat to the fabric to shrink the fabric around and into tight engagement with the reinforcing element and the inner sleeve;
- wrapping uncured rubber sheet material around the opposite end portions of the inner sleeve in a plurality of layers to form bands;
- sliding an uncured rubber outer sleeve over the shrunken fabric, the helical reinforcing element and the uncured rubber inner sleeve to form a tubular assembly;
- placing oppositely extending end portions of the of the uncured rubber outer sleeve over the bands;
- rotating the tubular assembly about its axis while wrapping a cord about the outer sleeve to press portions of the outer sleeve into the spaces between adjacent convolutions of the reinforcing element;
- heating the tubular assembly with the cord wrapped thereon to cure the inner and outer sleeves with the helical reinforcing element and the fabric embedded therein to provide a cured length of rubber tubing and to cure the respective end portions of the inner and outer sleeves and the respective bands together to form end cuffs; and
- rotating the rubber tubing about its axis in the reverse direction while unwrapping and removing the cord.

10. A method as defined in claim 9 wherein the uncured rubber inner sleeve and the uncured rubber outer sleeve each have opposite end portions that extend axially beyond the opposite ends of the metal reinforcing element.

11. A method as defined in claim 9 wherein the heat shrinkable fabric comprises polyolefin weft yarns.

12. A method as defined in claim 11 wherein the heat shrinkable fabric further comprises polyester warp yarns.

13. A method as defined in claim 9 wherein the uncured rubber inner sleeve and the uncured rubber outer sleeve are formed of different elastomeric compositions.

14. A method as defined in claim 9 wherein the helical reinforcing element is formed of stainless steel.

* * * * *